United States Patent [19]
Kaminow et al.

[11] 4,039,249
[45] Aug. 2, 1977

[54] INTEGRATED OPTICAL DEVICES INCLUDING TUNABLE FIXED GRATING

[75] Inventors: Ivan Paul Kaminow, New Shrewsbury; Herwig Werner Kogelnik, Fair Haven, both of N.J.

[73] Assignee: Bell Telephone Laboratories, Incorporated, Murray Hill, N.J.

[21] Appl. No.: 345,715

[22] Filed: Mar. 28, 1973

[51] Int. Cl.² .............................................. G02B 5/14
[52] U.S. Cl. .............................. 350/96 WG; 350/160 R
[58] Field of Search ...................... 350/96 WG, 160 R

[56] References Cited
U.S. PATENT DOCUMENTS

| 3,619,796 | 11/1971 | Seidel | 350/96 WG UX |
| 3,625,589 | 12/1971 | Snitzer | 350/96 WG |

OTHER PUBLICATIONS

Miller, "A Survey of Integrated Optics", *IEEE Journal of Quantum Electronics*, vol. QE-8, No. 2, Feb. 1972, pp. 199–205.

Russo et al., "Electrooptic Modulation in a Thin Film Waveguide", *Applied Optics*, vol. 10, No. 12, Dec. 1971, pp. 2786-2788.

Primary Examiner—Vincent P. McGraw
Attorney, Agent, or Firm—Lucian C. Canepa

[57] ABSTRACT

A tunable permanently fixed diffraction grating is interposed in the path of an optical beam propagated in an integrated-optics device. Tuning is accomplished, for example, by establishing a variable electric field in the propagating medium to control its refractive index. In that way the effective grating spacing is changed. As a result tunable optical filters and intensity modulators are thereby realized.

4 Claims, 3 Drawing Figures

INTEGRATED OPTICAL DEVICES INCLUDING TUNABLE FIXED GRATING

BACKGROUND OF THE INVENTION

This invention relates to integrated optical devices and, more particularly, to such devices utilized as tunable filters and intensity modulators.

Integrated optics is a recently developed technology in which thin-film techniques are applied to the fabrication of miniature compact optical devices. Due to their small size, rugged and reproducible construction and low cost, such devices are attractive candidates for inclusion in high-capacity optical communication systems.

For an overview of the field of integrated optics see, for example a "Survey of Integrated Optics" by S. E. Miller, *IEEE Journal of Quantum Electronics*, Vol. QE-8, No. 2, February 1972, pp. 199–205.

Considerable effort is being directed at developing integrated-optics versions of the various basic components that are needed in an optical communication system. Integrated optical devices, such as, for example, filters and intensity modulators, are among the important fundamental units that are required to make such a system a practical reality.

SUMMARY OF THE INVENTION

An object of the present invention is an integrated-optics device suitable for filtering and modulating optical waves.

Briefly, this and other objects of the invention are realized in a specific illustrative embodiment thereof that comprises a medium for guiding an optical beam. Interposed in the path of the guided beam is a permanently fixed diffraction grating. Tuning of the grating and therefore variation of the transmission characteristics of the device are accomplished by, for example, establishing a variable electric field in the medium to change its refractive index and thereby its propagation constant.

DETAILED DESCRIPTION

Figure 1:
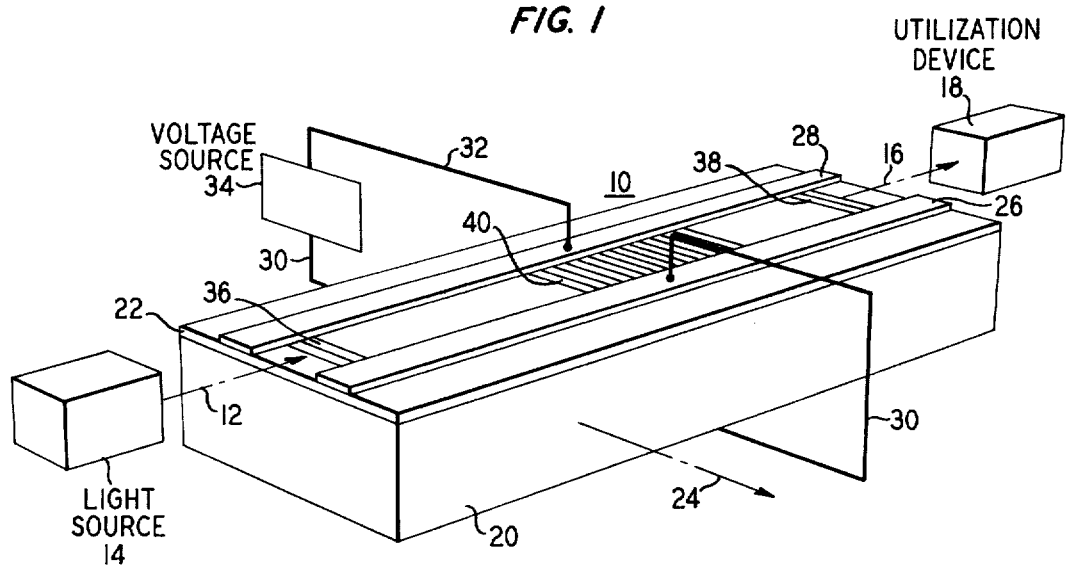
FIG. 1 depicts a specific illustrative device, including a tunable fixed diffraction grating, made in accordance with the principles of the present invention.

FIG. 1 is a pictorial illustration of an integrated-optics device 10 made in accordance with the principles of the present invention. The device 10 is positioned in the path of incident radiation (represented by dashed line 12) supplied by a light source 14. The radiation is typically coherent with wavelength(s) in the optical range (which includes visible and near-visible wavelengths) and may be provided by any suitable source, for example, a laser. Any portion of the incident beam that is transmitted through the device 10 is directed along an output path (indicated by line 16) to impinge upon a utilization device 18 that comprises, for example, a conventional photodetector.

The device 10 of FIG. 1 includes a substrate 20 on which a thin film 22 of electro-optic dielectric material is deposited. It is known that for the film 22 to support propagating optical modes and to act as a waveguide for light waves the refractive index of the film 22 must be greater than that of the substrate 20. Both of the indices are assumed to be greater than the refractive index of the air space above the device 10. If desired, a suitable covering layer (not shown) having an index of refraction less than that of the guiding film 22 may be deposited on the device to protect its upper surfaces and/or to provide a symmetrical guiding structure. The substrate 20 may, for example, be made of glass, with a suitable waveguiding layer or stripe of electro-optic material deposited on the substrate. But for purposes of a specific example herein it will be assumed that the substrate is instead made of $LiNbO_3$ which is an electro-optic material. Illustratively, the substrate is oriented such that the $c$ axis of the $LiNbO_3$ crystal is parallel to vector 24 shown in FIG. 1.

For a $LiNbO_3$ substrate, an optical waveguiding layer may be formed thereon by out-diffusion. The selective out-diffusion of $Li_2O$ in a substrate of $LiTaO_3$ or $LiNbO_3$ to form a surface guiding layer is disclosed in J. R. Carruthers-I. P. Kaminow application Ser. No. 324,884, filed Jan. 18, 1973, which issued on Sept. 24, 1974, as U.S. Pat. No. 3,837,827. Alternatively, a waveguiding layer may be formed on the substrate 20 by epitaxially depositing a higher-index layer thereon.

The device 10 shown in FIG. 1 also includes longitudinally extending electrodes 26 and 28. These may, for example, be formed by evaporating a layer of a suitable conductor such as aluminum onto the surface of the thin film 22 and then photolithographically removing selected portions thereof to form the two spaced-apart stripe electrodes 26 and 28. Leads 32 and 34 respectively connect the electrodes 26 and 28 to a variable voltage source 24.

Illustratively, the film 22 has a thickness approximating the wavelength of the radiation to be propagated therein, so that the radiation is effectively confined in the thickness dimension by the dielectric discontinuities provided by the major surfaces of the film, that is, the substrate-to-film and air space-to-film interfaces. For the purposes of our invention the thickness of the film may be anywhere within the range of 0.1 to 100 times the wavelength to be propagated as measured in the waveguide, but is preferably between 1 and 10 times the wavelength.

In such a planar waveguiding structure there is no beam spreading normal to the plane but some diffraction of the beam in the plane will occur. To limit such diffraction, formation of a higher-index layer on the substrate 22 may be restricted to the surface region of the substrate encompassed between the electrodes 26 and 28. Or after forming a higher-index layer 22 on the entire top surface of the substrate 20, all of that layer except the portion between the electrodes may be selectively removed by etching or ion milling or other techniques. In these ways waveguiding action may be limited to a narrow stripe in the device 10.

Radiation supplied by the source 14 may be introduced into and extracted from the film 22 of the device 10 in any one of a variety of ways known in the art. For example, prism couplers of the type described in *Applied Physics Letters*, Vol. 14, page 291 (1969), may be utilized for that purpose. Advantageously, in applications in which miniaturization, ruggedness and simplicity are important, optical coupling and decoupling are accomplished by means of optical diffraction gratings formed directly on the surface of the guiding film 22 so as to be structurally integral therewith. Such couplers, which are, for example, described in A. Ashkin- E. P. Ippen U.S. Pat. No. 3,674,335, issued July 4, 1972, can be constructed to exhibit coupling efficiencies of better than 70 percent.

For illustrative purposes gratings 36 and 38, each depicted as a series of parallel lines, are respectively utilized in the FIG. 1 device to couple optical waves into and out of the waveguiding film 22.

In accordance with the principles of the present invention, a diffraction grating 40, shown in FIG. 1 as a series of parallel lines, is formed on the thin film 22 between the electrodes 26 and 28. Illustratively, the grating lines of grating 40 are each oriented perpendicular to the direction of propagation of optical waves guided in the film 22.

The grating 40 may take any form that presents a periodic or near-periodic perturbation or discontinuity to optical waves propagating in the thin film 22. For instance, the depicted grating lines may comprise dielectric photoresist lines, engraved grooves in the film 22, or even metal stripes deposited on the film. Alternatively, the thickness of the film 22 may be spatially varied along the direction of propagation of optical waves in the device 10. Or the grating 40 may be formed by depositing a dielectric material of varying thickness over the film 22 between the electrodes 26 and 28 to load the film in a periodically perturbing fashion. Or the film itself may be selectively etched or ion milled to provide the desired perturbing profile.

Figure 2:
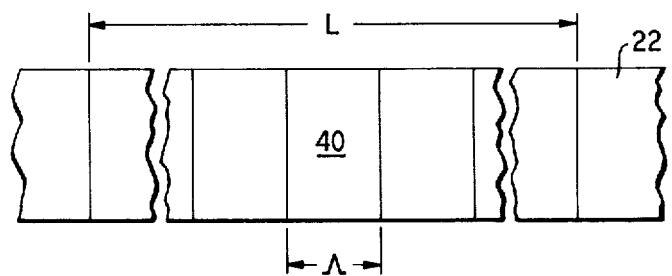
FIG. 2 is a top view of a portion of the tunable diffraction grating included in the FIG. 1 device.

Regardless of the technique utilized to form the grating 40 of FIG. 1, the grating may be represented as a series of spaced-apart physically fixed discontinuities in the waveguiding medium 22. Illustratively, adjacent discontinuities in the grating 40 are spaced apart a distance $\Lambda$ (See FIG. 2) and the overall length of the grating is designated L. Hereinafter $\Lambda$ will be referred to as the grating period or spacing.

For purposes of a specific illustrative example, assume that the source 14 shown in FIG. 1 is a helium-neon laser adjusted to supply a horizontally polarized light beam that includes a component having a free-space wavelength $\lambda$ which is equal to 0.63 microns. This beam, when coupled into the film 22 by the input grating 36, will propagate in the film in the TE optical mode. In this mode the electric vector of the propagating light is parallel to the $c$ axis of the aforementioned LiNbO$_3$ material of device 10.

With no voltage applied to the electrodes 26 and 28 of FIG. 1, let $n_f$ and $n_s$ designate the respective indices of refraction of the film 22 and the substrate 20, where $n_f > n_s$. In the no-field case the propagation constant characteristic of waves guided in the film 22 is designated $\beta$, where $n_s k < \beta < n_f k$ and $k = 2\pi/\lambda$. Define a quantity Q as equal to $2\pi/\Lambda$. It can be shown that an optical wave propagating in the film 22 will be scattered or totally reflected in the backward direction (toward the grating 36) by the grating 40 if $2\beta = Q$. This is equivalent to specifying that the grating period $\Lambda$ be approximately equal to $\lambda/2n_f$ since the difference between $n_f$ and $n_s$ is usually small. In practice the length of the grating 40 and the individual perturbations thereof may be selected to achieve complete or near-complete reflection of the guided optical beam when $2\beta = Q$.

Similarly, it can be shown that reasonably strong reflection occurs for $Q + \Delta Q > 2\beta > Q - \Delta Q$, where $\Delta Q = 2\pi/L$, and that the optical wave propagating in the thin film 22 will be transmitted through the grating 40 with low loss if $2\beta < Q - \Delta Q$. For a fixed grating, such as shown in FIG. 1, both Q and $\Delta Q$ are fixed quantities. Thus, for an optical signal having a fixed wavelength the required condition for low-loss transmission may be established by varying $n_f$ (and therefore $\beta$). Hereinafter the no-field and applied-field propagation constants will be designated $\beta_i$ and $\beta_n$, respectively.

In accordance with a particular aspect of the principles of this invention, $n_f$ is changed by applying a variable voltage between the electrodes 26 and 28 thereby to establish a variable electric field in the film 22. In this way the index of refraction of the electro-optic layer 22 is changed by an amount $\Delta n_f$. As a result, $\beta_i$ is correspondingly changed to a new value $\beta_n$ whose ratio to the no-field propagation constant is roughly $1 + \Delta n_f/n_f$ The required change in $\beta_i$ ($\Delta \beta$) to switch the herein-considered device between its reflecting and transmission states may be expressed as follows. For LiNbO$_3$, with $\lambda = 0.63$ microns, $k = 10$ (microns)$^{-1}$, $\beta_i = 22$ (microns)$^{-1}$, Q = 44 (microns)$^{-1}$ and $\Lambda = 0.14$ microns. If L = 1 centimeter $$\Delta \beta \approx \frac{\Delta n_f}{n_f} \beta_i \approx \Delta n_f \cdot k = \frac{1}{2} \Delta Q = \frac{\pi}{L} \tag{1}$$

or $$\Delta n_f = \frac{\Delta Q}{2k} = \frac{\lambda}{2L} = \frac{n_f \Lambda}{L} = \frac{n_f}{\gamma} \tag{2}$$

where $\gamma$, the number of grating periods in L, equals $7 \cdot 10^4$.

By applying a voltage to the electrodes 26 and 28 of FIG. 1, an electric field E$_3$ is established in the film 22 parallel to the $c$ axis thereof. This field introduces an index change $\Delta n_f$ in the film:

$$\Delta n_f = 1/2 \; n_f^3 \, r_{33} E_3 \tag{3}$$

where $r_{33}$ is the appropriate electro-optic coefficient of the film 22. From expression (2) above it is seen that $\Delta n_f$ must at least equal $n_f/\gamma$. Therefore, $$\Delta n_f = \frac{n_f}{\gamma} = \frac{1}{2} n_f^3 r_{33} E_3 \tag{4}$$

or $$E_3 = \frac{2}{\gamma \, n_f^2 \, r_{33}} . \tag{5}$$

For LiNbO$_3$, $r_{33} = 30 \cdot 10^{-10}$ centimeters per volt. Accordingly E$_3$ equals about $2 \cdot 10^3$ volts per centimeter. For a specific illustrative device in which the spacing W between the electrodes 26 and 28 is 10 microns, the voltage V required to be applied between the electrodes to achieve the desired change in $\beta_i$ is thus seen to be E·W or only about 2 volts.

In view of the description above, it is apparent that a device of the type shown in FIG. 1 may be operated as an optical intensity modulator for use, for example, in an optical communication system. In one such specific illustrative embodiment optical signals coupled into the film 22 from the source 14 are not delivered to the output utilization device 18 in the absence of an electric field established in the film. On the other hand, in the presence of an appropriate applied field therein, as defined above, optical signals are guided in a low-loss manner along the longitudinal extent of the film and coupled via the grating 38 to the output device 18.

Figure 3:
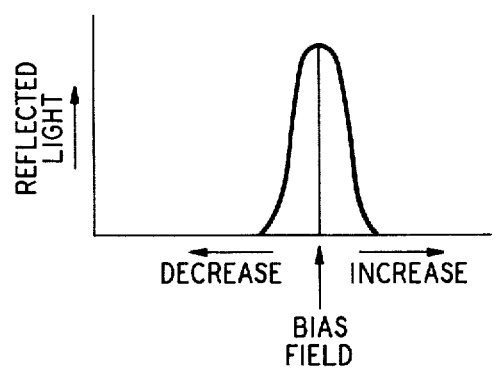
FIG. 3 is a graphical representation of the manner in which the reflectivity of the tunable grating may be selectively varied.

Alternatively, it is, of course, feasible to select the parameters of the device 10 such that the maximum-reflection or high-loss condition for optical signal propagation exists only in the presence of an applied electric field bias through the film 22. Increasing or decreasing the value of the bias field to at least some predetermined level may then be utilized to put the device in its maximum-transmission or low-loss state. This alternative mode of operation is graphically represented in FIG. 3.

The device 10 of FIG. 1 with its fixed grating 40 is also adapted to be utilized as a tunable optical filter. Thus, for example, by selectively changing the value of the bias field applied through the film 22 it is feasible to establish a characteristic curve of the type shown in FIG. 3 for any one of a range of optical wavelengths of interest. In other words, even though the period of the grating 40 is fixed, it is possible by discretely varying the applied electric bias field to change the value of the refractive index of the film 22 to satisfy the relationship $2\beta = Q$ or $\Lambda \simeq \lambda/2n_f$ for each one of a plurality of wavelengths. Moreover, by increasing or decreasing $\gamma$, it is possible to decrease or increase, respectively, the width of the applicable curve shown in FIG. 3. Correspondingly, as the width of the applicable curve decreases, the field required to switch the transmission characteristic of the device outside the band-stop region also decreases. By utilizing these techniques, it is feasible to construct optical filters that are designed to block preselected optical frequencies from appearing at the output of the device 10.

It is to be understood that the various above-described arrangements are only illustrative of the application of the principles of the present invention. In accordance with these principles numerous other arrangements may be devised by those skilled in the art without departing from the spirit and scope of the invention. For example, although emphasis herein has been directed to a device having a guiding layer whose propagation constant is selectively varied by an electric field, it is feasible to vary the propagation constant thereof in other ways thereby to achieve tuning of a fixed grating. Illustratively, the propagation constant of the guiding layer may also be altered by controlling the temperature thereof. Alternatively, the layer may be made of a suitable magneto-optic material whose propagation constant is selectively controlled by varying an applied magnetic field. Or other appropriate external influences, for example stress, can be applied to the waveguiding layer to change its propagation constant. In each such case the means utilized to tune the fixed grating is typically characterized by a period that is much greater than the length of the grating 40.

What is claimed is:

1. In combination, a substrate, a thin longitudinally extending planar dielectric film on said substrate, said film being characterized by a higher index of refraction than that of said substrate and being adapted to guide along the longitudinal extent thereof an incident optical beam that is directed at or near one end of said film, means for establishing a fixed diffraction grating in said film in the path of said guided beam, and means for controlling the propagation constant of said film thereby to vary the effective spacing of said grating, wherein said controlling means comprises two spaced-apart longitudinally extending electrodes on said guiding film for applying a variable electric field through said film in the vicinity of said fixed grating.

2. A combination as in claim 1 further including a voltage source connected to said electrodes.

3. A combination as in claim 2 further including means positioned at or near said one end of said film for coupling an incident optical beam into said film for propagation therealong, and means positioned at or near the other end of said film for abstracting said beam from said film.

4. An optical modulator comprising: a medium having a field-responsive index of refraction;
structure defining a periodic perturbation in said medium for reflecting radiation in said medium; and
means for imposing a uniform field in said medium for selectively controlling the magnitude of said radiation reflected by said periodic perturbation structure.

* * * * *